Figure 4:
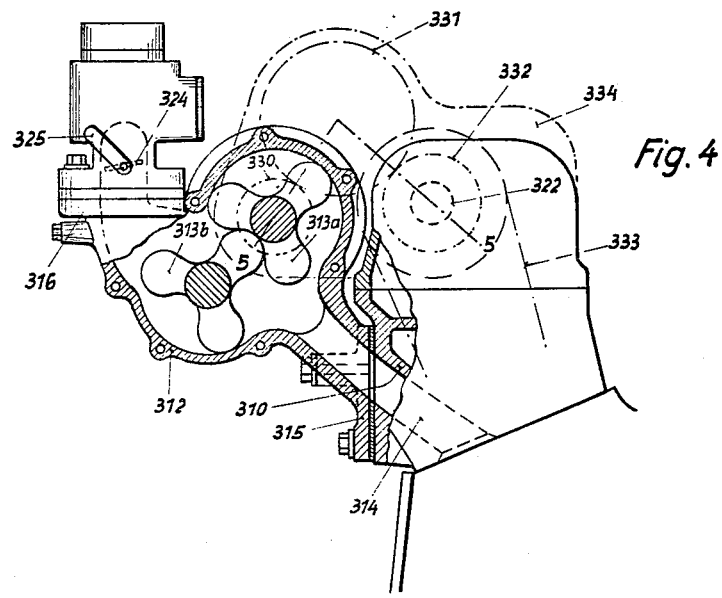

May 15, 1956 F. K. H. NALLINGER 2,745,392
INTERNAL COMBUSTION ENGINE WITH A SUPERCHARGER
Filed Nov. 24, 1951 2 Sheets—Sheet 1
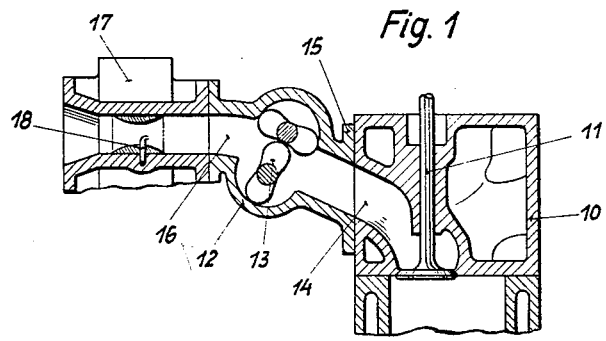
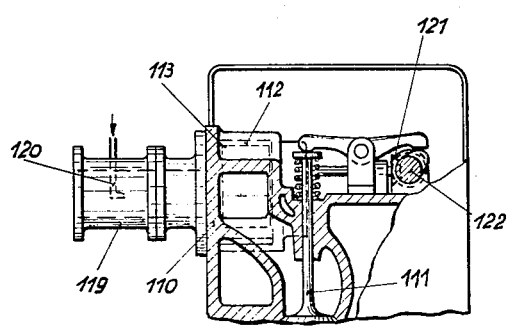
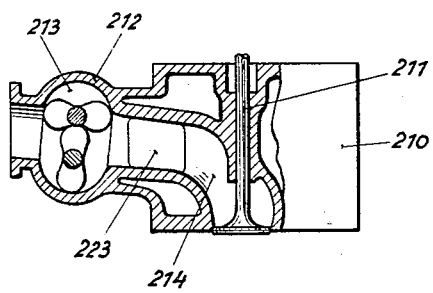
Inventor
Friedrich K. H. Nallinger
By Austin, Dicke, Wilhelm and Padlon
Attorneys United States Patent Office 2,745,392
Patented May 15, 1956

2,745,392

INTERNAL COMBUSTION ENGINE WITH A SUPERCHARGER

Friedrich K. H. Nallinger, Stuttgart, Germany, assignor to Daimler-Benz Aktiengesellschaft, Stuttgart-Unterturkheim, Germany Application November 24, 1951, Serial No. 258,013

Claims priority, application Germany November 25, 1950

19 Claims. (Cl. 123—119)

The invention relates to an internal combustion engine with a supercharger. One object of the invention is a spatially as much as possible compact construction of supercharger and engine.

It is a further object of the invention to keep the pressure losses of the supercharger as low as possible. Further objects of the invention refer to an arrangement, which guarantees as small condensation losses as possible of the fuel-air mixture, which is produced ahead of the supercharger, as well as furthermore a suitable drive of the supercharger.

According to that it is an essential characteristic of the invention that the supercharger is directly united with the cylinder head to one casing unit, particularly in such a manner that it is as directly as possible connected in series with the inlet section of the engine.

According to further characteristics of the invention the supercharger casing is either applied to the cylinder head as a separate construction unit or inserted into a recess of the same or manufactured as one piece with the latter or with the engine casing.

The invention may be utilized for any kind of engines, for example, both for carburetor operating and for injection operation. The carburetor can be directly connected in series with the supercharger as updraft, downdraft or horizontal carburetor.

Other objects and advantages in accordance with the present invention will become obvious when taken in connection with the drawing which shows for illustrative purposes only four embodiments in accordance with the present invention and wherein—

Figure 5:
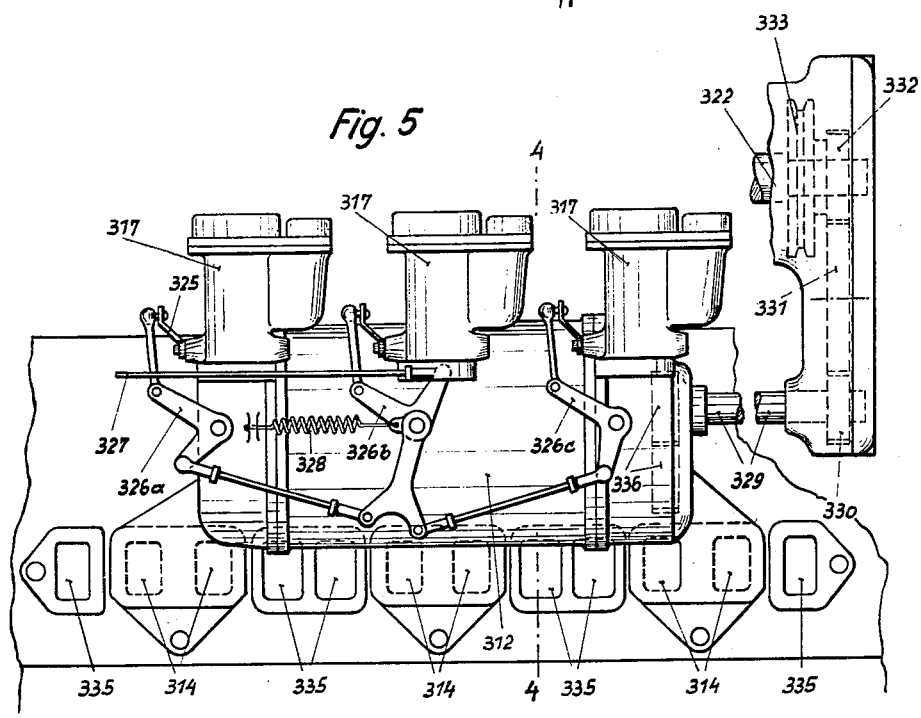

Fig. 1 shows a construction with a supercharger applied to the cylinder head,

Fig. 2 shows a construction with a supercharger inserted into the cylinder head, Fig. 3 shows a construction with a supercharger, the casing of which forms one piece with the cylinder head, Fig. 4 shows a construction for a multicylinder engine with several carburetors in section along the line 4—4 of Figure 5 and Fig. 5 shows a side view of the construction according to Figure 4 in which the gearing connection between the shafts 322 and 329 is rotated 90 degrees about the axis of rotation of shaft 329 so as to show more clearly some of the details thereof.

In Fig. 1 the supercharger casing 12 with the supercharger wings 13 is laterally connected with the cylinder head 10 with the inlet valve 11 by means of a flange 15, which encloses the inlet piping 14. The carburetor 17 with the carburetor nozzle 18 is flanged in appropriate manner to the inlet connection 16 of the supercharger.

In the embodiment according to Fig. 2 the supercharger casing 112 with the rotary piston 113 of the supercharger is inserted into the cylinder head 110. Ahead of the supercharger a pipe 119 is applied, into which an injection nozzle 120 opens, for example for gasoline injection. The drive of the supercharger is effected by a bevel gearing 121 from the control shaft 122 for the valves 111.

In the case of the embodiment according to Fig. 3 the supercharger 212 conveys into a collecting pipe 223, from which the individual inlet pipes 214 lead to the inlet valves 211. The casing 212 of the supercharger is cast in one piece with the cast piece of the cylinder head 210. Ahead of the supercharger 213 again a device for formation of a fuel-air mixture can be connected in series, for example, a gasoline carburetor or an injection device.

In the case of the embodiment according to Figs. 4 and 5 the supercharger casing 312 is flanged to the cylinder head 310 by means of individual flanges 315, which enclose the six inlet pipes 314. Three carburetors 317 are set on the three inlet connections 316 of the supercharger casing, the throttle valves 324 of which are connected with common operating rods 327 by means of levers 325, rods and intermediary levers 326a, b, c. A spring 328 seeks to adjust the throttle valves back into their closed position. The blower wings 313a and b are coupled by means of a pair of gear wheels 336. The blower can be developed as a one-chamber blower with continuous wings or rotary pistons, or it can be subdivided into chambers in such a manner that one chamber is assigned to each carburetor and to each pair of inlet connections. The drive of the blower is effected by a shaft 329 by means of a toothed-wheel gearing 330, 331, 332 from a shaft 322, which is arranged in the cylinder head, is parallel to the chankshaft and which for example controls the valves (not shown) and is for its part driven by a chain drive 333 from the crankshaft. The gear is in this connection arranged under a special hood 334 at the end of the cylinder head. 335 are the outlet passages of the engine.

The carburetor may in all cases be developed as an updraft, downdraft or horizontal carburetor, the drive can in all cases be effected by gear wheels, shafts, chains, belts or the like. The supercharger can be of any type, instead of roots type or rotary piston blower it can also be developed as a turboblower.

Otherwise the invention is not restricted to the figured embodiment, but it can be varied at discretion within the scope of the individual ideas of the invention.

What I claim is:

1. In an internal combustion engine a cylinder head with an inlet valve, an inlet port in the cylinder head leading to said inlet valve, a blower located above said inlet valve and adapted to supply the inlet port, and a blower casing directly united with the cylinder head to form one casing unit and to thereby provide a unitary structure with relatively short connections between said blower and said inlet valve so as to reduce the losses in such connections.

2. In an internal combustion engine a cylinder head with an inlet valve, an inlet port in the cylinder head leading to said inlet valve, a blower located above said inlet valve and adapted to supply the inlet port, and a blower casing with flanging means for attaching said blower casing to said cylinder head, so that it forms a casing unit with the latter and provides a unitary structure with relatively short connections between said blower and said inlet valve so as to reduce the losses in such connections.

3. In an internal combustion engine a cylinder head with an inlet valve, an inlet port in the cylinder head leading to said inlet valve, a recess in the cylinder head, a blower located above said inlet valve adapted to supply the inlet port, and a blower casing inserted into the recess of said cylinder head providing a unitary structure with relatively short connections between said blower and said inlet valve so as to reduce the losses in such connections.

4. In an internal combustion engine a cylinder head with an inlet valve, an inlet port in the cylinder head leading to said inlet valve, a blower in the cylinder head located above said inlet valve and adapted to supply the inlet port, said cylinder head itself forming the casing of said blower to thereby provide a unitary structure with relatively short connections between said blower and said inlet valve so as to reduce the losses in such connections.

5. In a multicylinder internal combustion engine a cylinder head and an inlet valve for each cylinder, several inlet ports in the cylinder head for the several cylinders of the engine leading to respective inlet valves, a blower located above said inlet valves with a blower casing united directly to form one casing unit with the cylinder head, the blower adapted to supply the several inlet ports as a common blower thereby providing a unitary structure by said blower casing and said cylinder head and reducing the length of the connections between said common blower and the several inlet ports so as to minimize the flow losses therein.

6. In an internal combustion engine the combination according to claim 1, furthermore comprising a carburetor device, which is inserted directly ahead of the blower.

7. In an internal combustion engine the combination according to claim 1, furthermore comprising a carburetor, directly inserted ahead of the blower as a downdraft carburetor and set on top of said blower casing.

8. In an internal combustion engine the combination according to claim 5, furthermore comprising a carburetor, inserted ahead of the blower and joined to the blower casing.

9. In an internal combustion engine the combination according to claim 1, further comprising a drive wheel at one end of the cylinder head, means for driving said drive wheel by said engine, and means for driving said blower by said drive wheel.

10. In an internal combustion engine with a crankshaft the combination according to claim 1, wherein the axis of rotation of said blower extends parallel to said crankshaft, a driving shaft coaxial with said axis of rotation, a toothed-wheel gearing between said driving shaft and said blower, and means for driving said driving shaft by said crankshaft.

11. In a multi-cylinder internal combustion engine a cylinder head, several inlet ports in said cylinder head for the several cylinders of the internal combustion engine, a blower including a blower casing, several duct means connecting said blower with said several inlet ports, several carburetors for the several cylinders, said blower suppying the several inlet ports as a common blower.

12. In a multi-cylinder internal combustion engine a cylinder head, several inlet ports in said cylinder head for the several cylinders of the engine, blower means including a blower casing, several pipes connecting said blower means with said several inlet ports, several carburetors for the several cylinders, said carburetors being located immediately ahead of said blower means, said blower means supplying said several inlet ports as a common blower.

13. In a multi-cylinder internal combustion engine a cylinder head, several inlet ports in said cylinder head for the several cylinders of the engine, a blower having a blower casing, several pipe means connecting said blower with the several inlet ports, several carburetors for the several cylinders, said carburetors being located immediately ahead of the blower as downdraft carburetors and being joined to said blower casing, said blower supplying the several inlet ports as a common blower.

14. In a multi-cylinder internal combustion engine a cylinder head, several inlet ports in the cylinder head for the several cylinders of the engine, a blower including a blower casing, said blower casing being directly united with said cylinder head to form one casing unit, several separate duct means from the blower to the several inlet ports, several carburetors for the several cylinders, said blower supplying said inlet ports as a common blower.

15. In a multi-cylinder internal combustion engine a cylinder head, several inlet pipes in the cylinder head for the several cylinders of the engine, a blower having a blower casing directly united with said cylinder head to form a single casing unit, several separate pipe means from the blower to said several inlet pipes, said blower supplying said inlet pipes as a common blower, and each of said inlet pipes together with a corresponding pipe means providing a substantially rectilinear path traversed by the contents discharged by said blower in the direction of said cylinder head.

16. In a multi-cylinder internal combustion engine a cylinder head, several inlet ports in said cylinder head for the several cylinders of the engine, blower means including a blower casing directly connected with the said cylinder head to form one casing unit, several separate pipe means from the blower means to said several inlet ports, carburetor means located ahead of said blower means and directly connected with said blower casing, said blower means supplying the several inlet ports as a common blower.

17. In an internal combustion engine, a cylinder head, an inlet port in said cylinder head, a blower for supplying said inlet port, a blower casing directly united with said cylinder head to form one casing unit, a drive wheel at one end of said cylinder head, means for driving said drive wheel by said engine, means for driving said blower by said drive wheel, a valve shaft, means for mounting said drive wheel on said valve shaft, said means for driving said blower including a further wheel, and means for mounting said further wheel on the axle of said blower.

18. In a multi-cylinder internal combustion engine, a cylinder head, several inlet ports in said cylinder head for the several cylinders of the engine, blower means including a blower casing directly connected with said cylinder head to form one casing unit, means for connecting said blower means with said several inlet ports to provide an essentially rectilinear path for the contents discharged by said blower means, carburetor means located ahead of said blower means and directly connected with said blower casing, said blower means supplying the several inlet ports as a common blower.

19. In a multi-cylinder internal combustion engine, a cylinder head, several inlet ports in the cylinder head for the several cylinders of the engine, a blower including a blower casing, said blower casing being directly united with said cylinder head to form one casing unit, several relatively short, substantially straight duct means from the blower to the several inlet ports, carburetor means for the several cylinders, said blower supplying said inlet ports as a common blower.

References Cited in the file of this patent

UNITED STATES PATENTS

| | | |
|---|---|---|
| 1,898,460 | Newcomb | Feb. 21, 1933 |
| 2,142,210 | Rippingille | Jan. 3, 1939 |
| 2,311,936 | Elfes et al. | Feb. 23, 1943 |
| 2,576,475 | Perrine | Nov. 27, 1951 |

FOREIGN PATENTS

| | | |
|---|---|---|
| 224,448 | Great Britain | Nov. 13, 1924 |